(12) United States Patent
Kim et al.

(10) Patent No.: US 11,071,069 B2
(45) Date of Patent: *Jul. 20, 2021

(54) METHOD AND APPARATUS FOR TRANSMITTING A POWER HEADROOM REPORT OF A UE IN A WIRELESS COMMUNICATION SYSTEM

(71) Applicant: Samsung Electronics Co., Ltd., Gyeonggi-do (KR)

(72) Inventors: Soeng-Hun Kim, Gyeonggi-do (KR); Himke Van Der Velde, Middlesex (GB)

(73) Assignee: Samsung Electronics Co., Ltd

( * ) Notice: Subject to any disclaimer, the term of this patent is extended or adjusted under 35 U.S.C. 154(b) by 0 days.

This patent is subject to a terminal disclaimer.

(21) Appl. No.: 16/543,062

(22) Filed: Aug. 16, 2019

(65) Prior Publication Data
US 2019/0373566 A1 Dec. 5, 2019

Related U.S. Application Data

(63) Continuation of application No. 14/837,817, filed on Aug. 27, 2015, now Pat. No. 10,390,315, which is a (Continued)

(30) Foreign Application Priority Data

Mar. 17, 2009 (KR) ........................ 10-2009-0022719

(51) Int. Cl.
*H04W 52/36* (2009.01)
*H04W 72/12* (2009.01)
(Continued)

(52) U.S. Cl.
CPC ..... *H04W 52/365* (2013.01); *H04W 36/0016* (2013.01); *H04W 72/0406* (2013.01);
(Continued)

(58) Field of Classification Search
CPC ........... H04W 52/365; H04W 72/0406; H04W 72/1284
See application file for complete search history.

(56) References Cited

U.S. PATENT DOCUMENTS

2001/0000168 A1 4/2001 Esmailzadeh et al.
2002/0034170 A1 3/2002 Tiedemann et al.
(Continued)

FOREIGN PATENT DOCUMENTS

CN 101 194 476 6/2008
CN 101299885 11/2008
(Continued)

OTHER PUBLICATIONS

Nokia Corporation, Nokia Siemens Networks; "Power Headroom Reporting"; 3GPP TSG-RAN WG2 Meeting #62 Kansas City, USA May 5-9, 2008; R2-082197 (Year: 2008).*
Alcatel-Lucent; "TP on Power Headroom reporting"; 3GPP TSG RAN WG2 #62 May 5-9, 2008 Kansas City, US; R2-082224 (Year: 2008).*
Ericsson, "Miscellaneous Corrections to MAC", R2-091659, 3GPP TSG-RAN2 Meeting #65, Feb. 13, 2009.
(Continued)

*Primary Examiner* — Gary Mui
(74) *Attorney, Agent, or Firm* — The Farrell Law Firm, P.C.

(57) ABSTRACT

A method of a terminal in a wireless communication system is provided. The method includes performing a medium access control (MAC) reset; stopping a running periodic power headroom report (PHR) timer, when the MAC reset is performed; receiving, from a second cell, information for allocating an uplink resource; starting the stopped periodic PHR timer when the uplink resource is first allocated for a new transmission since the MAC reset is performed, without transmitting a PHR; triggering a PHR when the started periodic PHR timer expires; transmitting, to the second cell, the triggered PHR; and starting the expired periodic PHR timer.

14 Claims, 6 Drawing Sheets

Related U.S. Application Data continuation of application No. 14/788,034, filed on Jun. 30, 2015, now Pat. No. 10,368,323, which is a continuation-in-part of application No. 12/725,916, filed on Mar. 17, 2010, now Pat. No. 10,375,656.

(51) Int. Cl.
*H04W 72/04* (2009.01)
*H04W 36/00* (2009.01)
*H04W 88/02* (2009.01)
*H04W 88/08* (2009.01)

(52) U.S. Cl.
CPC ........ *H04W 72/1284* (2013.01); *H04W 88/02* (2013.01); *H04W 88/08* (2013.01)

(56) References Cited

U.S. PATENT DOCUMENTS

| | | | |
|---|---|---|---|
| 2003/0096630 | A1 | 5/2003 | Dartois |
| 2006/0280145 | A1 | 12/2006 | Revel et al. |
| 2007/0042784 | A1 | 2/2007 | Anderson |
| 2007/0047452 | A1* | 3/2007 | Lohr ................ H04L 47/14 370/242 |
| 2009/0238136 | A1 | 9/2009 | Sambhwani et al. |
| 2009/0245191 | A1 | 10/2009 | Ball et al. |
| 2009/0318180 | A1 | 12/2009 | Yi et al. |
| 2010/0098011 | A1 | 4/2010 | Pelletier et al. |
| 2010/0158147 | A1 | 6/2010 | Zhang |
| 2010/0234037 | A1 | 9/2010 | Terry et al. |
| 2010/0254351 | A1 | 10/2010 | Wang |
| 2011/0002262 | A1 | 1/2011 | Wang et al. |

FOREIGN PATENT DOCUMENTS

| | | |
|---|---|---|
| CN | 102067480 | 5/2011 |
| EP | 1 317 076 | 6/2003 |
| RU | 2 251 805 | 5/2005 |
| WO | WO 2008/131902 | 11/2008 |
| WO | WO 2009/022812 | 2/2009 |

OTHER PUBLICATIONS

Samsung, "PHR Timer Handling after Handover", R2-092588, 3GPP TSG-RAN2#65bis meeting, Mar. 28, 2009.

Infineon Technologies, "Clarification on the PHR Trigger Condition in Case of Prohibit_PHR_Timer Expiry", R2-092442, 3GPP TSG-RAN WG2 Meeting #65, Mar. 16, 2009.

Japanese Office Action dated Nov. 11, 2014 issued in counterpart application No. 2014-057860.

Nokia Corporation et al., "PHR and BSR Periodic Timer Start", R2-085000, 3GPP TSG-RAN2 Meeting #63bis, Sep.-Oct. 3, 2008, 4 pages.

LG Electronics Inc., "Report of E-mail discussion on MAC <-> RRC Interaction on MAC Reset and Configuration", R2-086338, 3GPP TSG-RAN WG2 #64, Nov. 10-14, 2008, 7 pages.

Korean Office Action dated Aug. 6, 2015 issued in counterpart application No. 10-2009-0022719, 6 pages.

Nokia Siemens Networks et al., "Triggers for Power Headroom Reports in EUTRAN Uplink", R1-080947, 3GPP TSG RAN WG1 #52 Meeting, Feb. 11-15, 2008, 3 pages.

Ericsson, "Text for MAC Reset and Reconfiguration", R2-085391, 3GPP TSG-RAN2 Meeting #63bis, Sep. 29-Oct. 3, 2008, 3 pages.

Samsung, "Correction on PHR Triggering Condition", R2-085800, 3GPP TSG-RAN2#63bis Meeting, Sep. 29-Oct. 3, 2008, 2 pages.

Nokia Siemens Networks et al., "Usage of RRC Parameters", R2-091651, 3GPP TSG-RAN2 Meeting #65, Feb. 9-13, 2009, 17 pages.

European Search Report dated Jan. 4, 2017 issued in counterpart application No. 10753696.3-1854, 11 pages.

U.S. Office Action dated Feb. 27, 2017 issued in counterpart U.S. Appl. No. 12/725,916, 22 pages.

Nokia Corporation, Nokia Siemens Networks, "PHR Periodic Timer Start", R2-086073, 3GPP TSG-RAN2 Meeting #64, Oct. 10-14, 2008, 3 pages.

Chinese Office Action dated Oct. 9, 2017 issued in counterpart application No. 201510187587.6, 17 pages.

* cited by examiner

METHOD AND APPARATUS FOR TRANSMITTING A POWER HEADROOM REPORT OF A UE IN A WIRELESS COMMUNICATION SYSTEM

PRIORITY

This application is a Continuation of, and claims priority under 35 U.S.C. § 120 to, U.S. patent application Ser. No. 14/837,817, which was filed in the U.S. Patent and Trademark Office on Aug. 27, 2015 and which is a Continuation of, and claims priority under 35 U.S.C. § 120 to, U.S. patent application Ser. No. 14/788,034, which was filed in the U.S. Patent and Trademark Office on Jun. 30, 2015, and is now U.S. Pat. No. 10,368,323 issued on Jul. 30, 2019, and which is a Continuation of, and claims priority under 35 U.S.C. § 120 to, U.S. patent application Ser. No. 12/725,916, which was filed in the U.S. Patent and Trademark Office on Mar. 17, 2010, and is now U.S. Pat. No. 10,375,656 issued on Aug. 6, 2019, and claimed priority under 35 U.S.C. § 119(a) to a Korean Patent Application filed in the Korean Intellectual Property Office on Mar. 17, 2009 and assigned Serial No. 10-2009-0022719, the entire disclosures of all of which are incorporated herein by reference.

BACKGROUND OF THE INVENTION

1. Field of the Invention

The present invention relates generally to a method and apparatus for transmitting scheduling information by a User Equipment (UE) in a wireless communication system, and more particularly, to a method and apparatus for transmitting available transmit power information (or a power headroom report) by a UE in a wireless communication system.

2. Description of the Related Art

A Universal Mobile Telecommunication Service (UMTS) system is a $3^{rd}$ Generation (3G) wireless communication system that is based on Global System for Mobile communications (GSM) and General Packet Radio Services (GPRS), which are asynchronous communication systems, and uses Wideband Code Division Multiple Access (WCDMA). Previously, the $3^{rd}$ Generation Partnership Project (3GPP) in charge of standardization of the UMTS system proposed a High Speed Downlink Packet Access (HSDPA)/High Speed Uplink Packet Access (HSUPA) system capable of supporting a data rate of up to 10 Mbps in a downlink, as a wireless communication system provided by improving the UMTS system. Further, the HSDPA/HSUPA system has now been commercialized and is now providing services.

Since the proposal of the HSDPA/HSUPA, the 3GPP has more recently suggested a Long Term Evolution (LTE) system as an evolved next-generation wireless communication system. The LTE system will implement high-speed packet-based communication at a data rate of up to 100 Mbps. Accordingly, many studies are underway for commercialization the LTE system.

In both the HSDPA/HSUPA system and LTE system proposed by the 3GPP, a Node B or Evolved Node B (ENB) receives scheduling information from UEs for scheduling the allocation of transmission resources to the UEs. The scheduling information may include, for example, UE buffer status information, available transmit power information, etc.

The buffer status information is information with which the UE informs the ENB of the amount of transmission data in a UE transmission buffer. The available transmit power information is information with which the UE informs the ENB of the amount of power available for uplink transmission. Upon receiving the available transmit power information, the ENB performs scheduling in order to avoid a scheduling error by a UE maximum output limit.

FIG. 1 illustrates a configuration of an LTE system.

Referring to FIG. 1, Evolved Radio Access Networks (E-RANs) 110 and 112 are simplified to a 2-node configuration including ENBs 120, 122, 124, 126, and 128, and upper nodes (also known as access gateways) 130 and 132. A UE 101 accesses an Internet Protocol (IP) network 114 through the E-RANs 110 and 112. The ENBs 120 to 128 correspond to legacy Node Bs of an existing UMTS system. Each of the ENBs 120 to 128 is connected to the UE 101 by a wireless channel, and performs complex functions when compared with the function performed by legacy Node Bs.

In the LTE system, because every user traffic including a real-time service, like Voice over IP (VoIP), based on the Internet protocol, is serviced over a shared channel, an apparatus for performing scheduling by collecting status information of UEs is needed, and this scheduling is managed by the ENBs 120 to 128. Generally, one of the ENBs 120 to 128 controls multiple cells. In FIG. 1, it is assumed that ENB 122 is the controlling ENB.

In order to implement a data rate of up to 100 Mbps, the LTE system uses Orthogonal Frequency Division Multiplexing (OFDM) as a wireless access technology in a bandwidth of up to 20 MHz. In addition, the LTE system uses Adaptive Modulation & Coding (AMC) to determine a modulation scheme and a channel coding rate according to UE channel status.

For example, ENB 122 receives reports on a variety of scheduling information from UE 101 in order to allocate transmission resources to UE 101, i.e., a scheduling operation. Examples of such scheduling information include the buffer status information or Buffer Status Report (BSR) about an amount and type of data UE 101 stores in its transmission buffer, and available transmit power information about available transmit power for UE 101.

The BSR is information indicating an amount of data UE 101 stores in its transmission buffer for uplink transmission, according to the priority. If particular conditions are satisfied, UE 101 generates the BSR and transmits it to ENB 122. For example, the particular conditions may include a situation in which UE 101, which previously had no data stored in it, now has new data to transmit, and a situation in which a predetermined time has elapsed since a previous transmission of the BSR.

The available transmit power information is information indicating an available power that UE 101 can use for uplink data transmission, based on its current channel status. The available transmit power information is transmitted from UE 101 to the ENB 122 using a message of a Medium Access Control (MAC) layer, and is commonly called an Uplink Power Headroom (UPH) or Power Headroom Report (PHR). In the following description, the available transmit power information will be referred to as a PHR.

More specifically, the PHR is defined as a difference between a required transmit power required for uplink transmission and a maximum transmit power for UE 101, when UE 101 performs uplink transmission using the transmission resource and Modulation & Coding Scheme (MCS)

level allocated from ENB 122. A method of calculating the PHR may be modified appropriately depending on system conditions.

If the following particular conditions are satisfied, UE 101 generates the PHR and then transmits it to the ENB 122.

Condition 1) A change in a path loss measured by UE 101 exceeds a threshold.

Condition 2) A predetermined time has elapsed since UE 101 transmitted the PHR.

Before performing uplink transmission, UE 101 checks if any one of the above two conditions is satisfied, and if so, includes a PHR in an uplink transmission packet during transmission. In the LTE system, a packet carrying the PHR includes a MAC Protocol Data Unit (PDU).

A PHR generated by Condition 1) is commonly referred to as a regular PHR, and a PHR generated by Condition 2) is commonly referred to as a periodic PHR.

In the LTE system, generation of the periodic PHR is controlled by a timer, i.e., a PHR Periodic Timer. UE 101 starts the PHR Periodic Timer after transmitting a periodic PHR, and when the PHR Periodic Timer expires, UE 101 includes a next periodic PHR in a first MAC PDU being transmitted, and restarts the PHR Periodic Timer. UE 101 repeats this operation.

Additionally, UE 101 resets the MAC in order to receive a handover command from an ENB of the source cell. In the MAC reset process, UE 101 stops all timers in operation, including the PHR Periodic Timer. Because the PHR Periodic Timer is then restarted only when the PHR is generated, the stopped PHR Periodic Timer is not restarted unless a new PHR is generated in a target cell.

Therefore, if only the periodic PHR is set in the UE, excluding the regular PHR, the new PHR is generated only at the expiration of the PHR Periodic Timer. However, because the PHR Periodic Timer was stopped and will not restart, due to the MAC reset as described above, the UE may no longer generate the periodic PHR after its handover to the target cell.

SUMMARY OF THE INVENTION

The present invention is designed to address at least the above-described problems and/or disadvantages in the prior art and to provide at least the advantages as will be described below. Accordingly, an aspect of the present invention is to provide a method and apparatus for preventing transmission interruption of scheduling information transmitted from a UE to an ENB in a wireless communication system.

Another aspect of the present invention is to provide a method and apparatus for preventing transmission interruption of available transmit power information transmitted from a UE to an ENB in a wireless communication system.

Another aspect of the present invention is to provide a method and apparatus for reporting available transmit power information of a UE, upon an occurrence of a MAC reset in a wireless communication system.

Another aspect of the present invention is to provide a method and apparatus for resuming transmission of available transmit power information of a UE, upon an occurrence of a MAC reset in a wireless communication system.

In accordance with an aspect of the present invention, a method of a terminal in a wireless communication system is provided. The method includes performing a medium access control (MAC) reset; stopping a running periodic power headroom report (PHR) timer, when the MAC reset is performed; receiving, from a second cell, information for allocating an uplink resource; starting the stopped periodic PHR timer when the uplink resource is first allocated for a new transmission since the MAC reset is performed, without transmitting a PHR; triggering a PHR when the started periodic PHR timer expires; transmitting, to the second cell, the triggered PHR; and starting the expired periodic PHR timer.

BRIEF DESCRIPTION OF THE DRAWINGS

The above and other aspects, features, and advantages of certain embodiments of the present invention will be more apparent from the following description taken in conjunction with the accompanying drawings, in which.

Throughout the drawings, the same drawing reference numerals will be understood to refer to the same elements, features and structures.

DETAILED DESCRIPTION OF EMBODIMENTS OF THE INVENTION

Various embodiments of the present invention will now be described in detail with reference to the annexed drawings. In the following description, a detailed description of known functions and configurations incorporated herein has been omitted for clarity and conciseness, i.e., to avoid obscuring the invention in unnecessary details. Terms used herein are defined based on functions in the present invention and may vary according to users, operator intention, or usual practices. Therefore, the definition of the terms used herein should be based on contents throughout the specification.

As described above, an aspect of the present invention is to provide a method and apparatus for solving problems that occur in a conventional UE, in which only a periodic PHR is set, wherein the UE no longer generates a PHR in a target cell due to a MAC reset after performing a handover to the target cell. Accordingly, herein below in this specification, the term "PHR" is to be construed as "a periodic PHR" unless stated otherwise.

Figure 1:
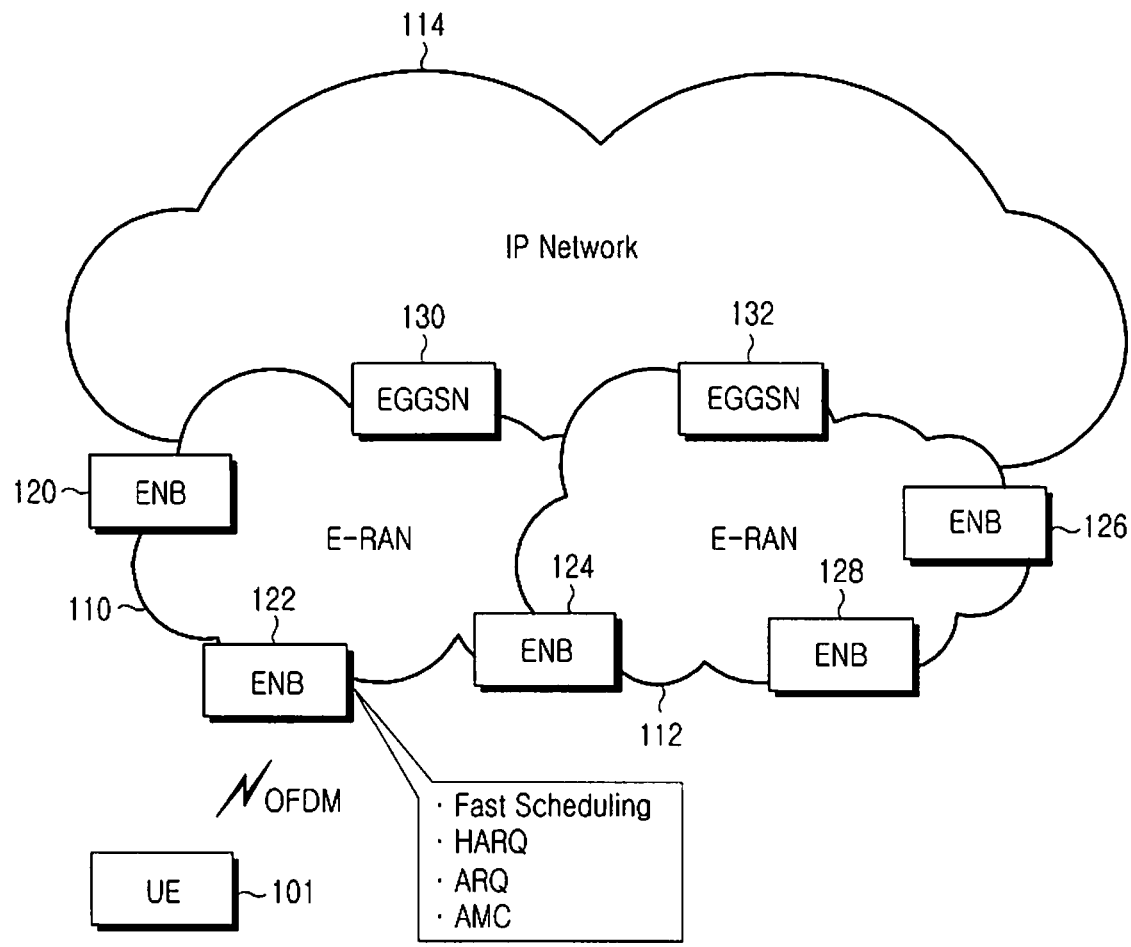
FIG. 1 is a diagram illustrating a configuration of an LTE system.

While certain embodiments of the present invention will be described in connection with the LTE system illustrated and described in FIG. 1, the same may be applied to any system in which a mobile station corresponding to the UE transmits available transmit power information or scheduling information needing periodic transmission to a base station corresponding to the ENB. That is, the present invention may be applied in the same way to any system in which a UE starts a timer for transmission of scheduling information and the timer is reset upon handover of the UE.

In accordance with an embodiment of the present invention, after a MAC reset occurs in a UE, the UE stops all timers, except for a timer involved in the generation of a PHR.

In accordance with another embodiment of the present invention, after a MAC reset occurs in a UE, the UE stops all timers therein and then restarts a timer involved in generation of a PHR, upon completion of the MAC reset.

In accordance with another embodiment of the present invention, after a MAC reset occurs in a UE, the UE restarts a timer involved in the generation of a PHR, after receiving a first uplink grant from an ENB.

In accordance with another embodiment of the present invention, after a MAC reset occurs in a UE, the UE generates a PHR after receiving a first uplink grant from the ENB.

As the above-mention embodiments of the present invention are described in more detail below, it will be assumed that the MAC reset occurs in the UE, upon a handover of the UE. However, the embodiments of the present invention may be applied even when the MAC reset occurs for other reasons.

Figure 2:
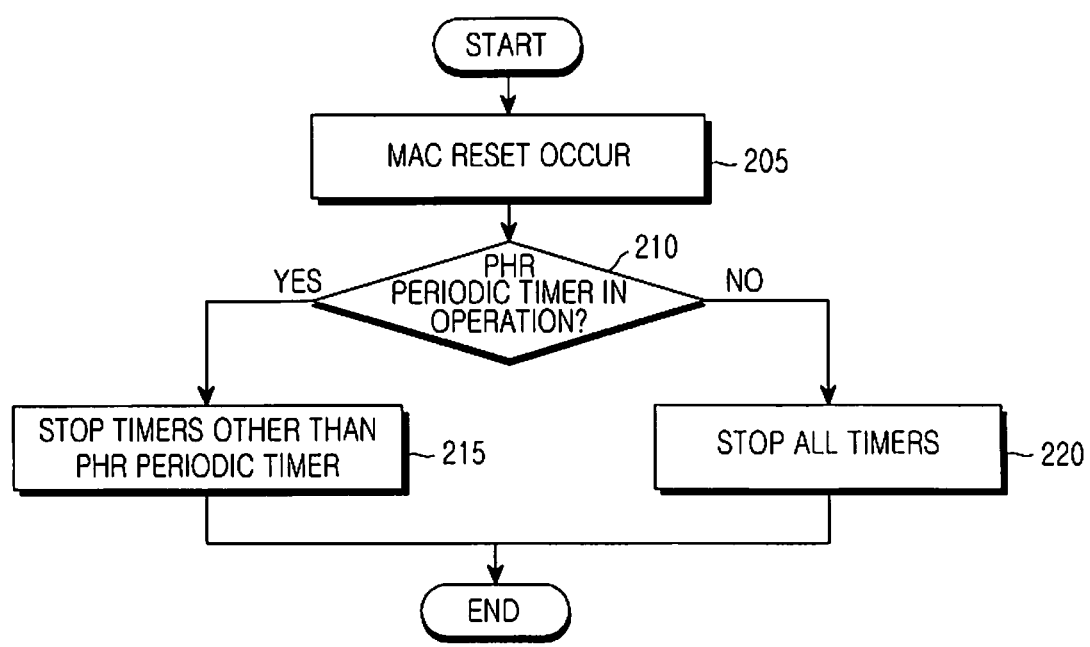
FIG. 2 is a flowchart illustrating an operation of a UE according to an embodiment of the present invention.

FIG. 2 illustrates an operation of a UE according to an embodiment of the present invention, wherein upon occurrence of a MAC reset, the UE controls a PHR Periodic Timer.

As described above, one of the problems to be solved by the present invention arises because upon a MAC reset in a UE, the UE stops a PHR Periodic Timer for PHR generation. Accordingly, to address this problem, in accordance with an embodiment of the present invention, as illustrated in FIG. 2, the UE stops all timers therein, except for the PHR Periodic Timer.

Referring to FIG. 2, a MAC reset occurs before handover of a UE in step 205. The MAC reset is generally performed prior to starting a handover, and the UE resets the MAC, upon receiving a handover command from an ENB.

In step 210, the UE determines if a PHR Periodic Timer is operating during the MAC reset. If the PHR Periodic Timer is operating, the UE stops all timers in the UE, except for the PHR Periodic Timer, in step 215. However, if the PHR Periodic Timer is not operating during the MAC reset in step 210, e.g., if the PHR Periodic Timer is not set, the UE stops all timers in the UE in step 220.

Figure 3:
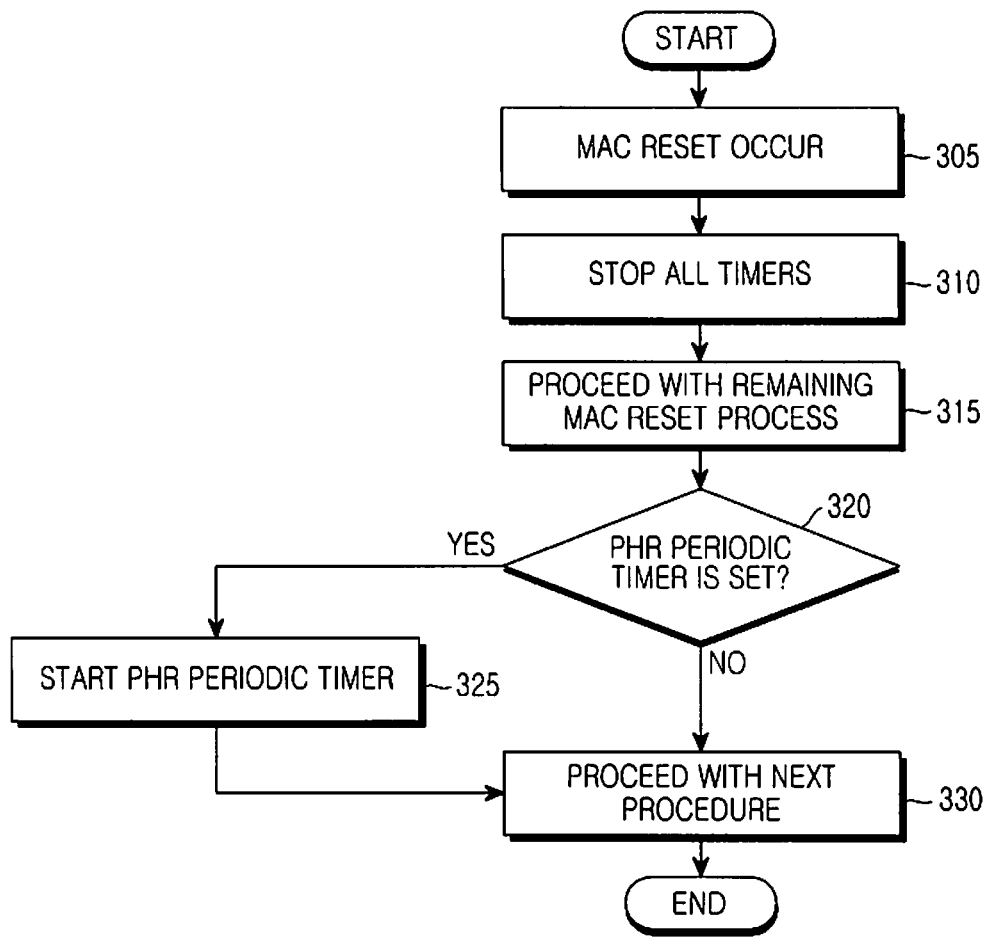
FIG. 3 is a flowchart illustrating an operation of a UE according to an embodiment of the present invention.

FIG. 3 illustrates an operation of UE according to another embodiment of the present invention, wherein upon occurrence of a MAC reset, the UE stops a PHR Periodic Timer, and restarts the PHR Periodic Timer, after the MAC reset is completed. By restarting the PHR Periodic Timer after the MAC reset is completed, the periodic PHR can be continuously generated, even after the MAC reset.

Referring to FIG. 3, a MAC reset starts, prior to a handover of the UE, in step 305. The UE stops all timers operating in the UE in step 310. The UE proceeds with the remaining MAC reset process in step 315. The remaining MAC reset process includes, for example, terminating ongoing MAC processes and releasing the resources allocated to the MAC layer.

After the MAC reset process is completed in step 315, the UE determines whether a PHR Periodic Timer for generation of a PHR was set prior to the MAC reset in step 320. If the PHR Periodic Timer was previously set, the UE restarts the PHR Periodic Timer in step 325, identifying that the PHR Periodic Timer was stopped in the MAC reset process in step 310, and then proceeds with a next procedure in step 330. The next procedure may include, for example, a random access process in the target cell. If the PHR Periodic Timer was not previously set in step 320, the UE performs the next procedure in step 330.

Figure 4:
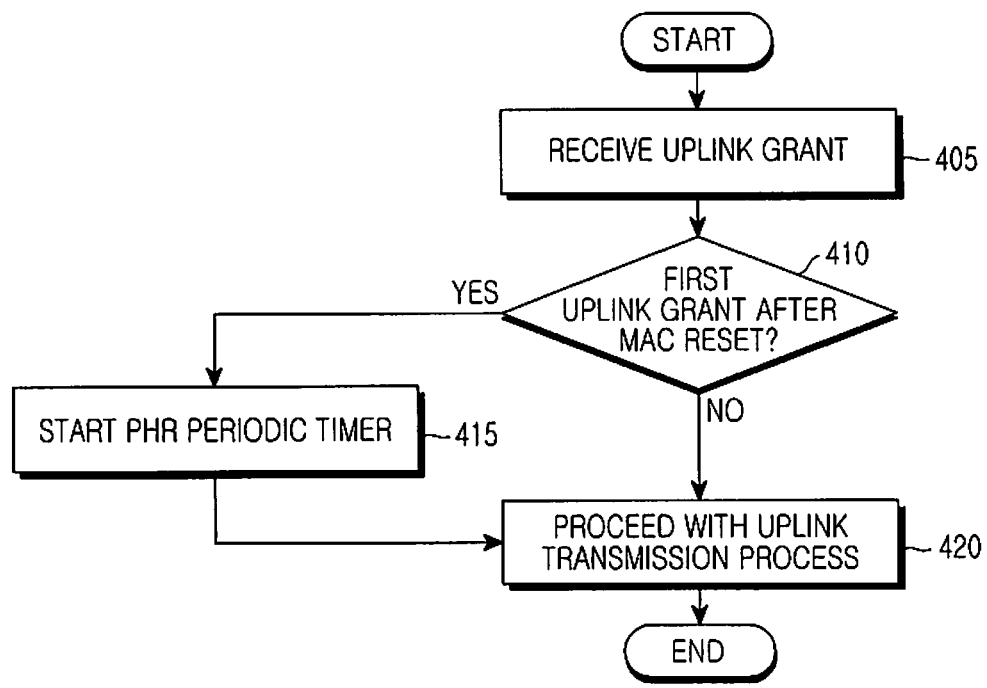
FIG. 4 is a flowchart illustrating an operation of a UE according to an embodiment of the present invention.

FIG. 4 illustrates an operation of a UE according to another embodiment of the present invention, wherein the UE restarts a PHR Periodic Timer upon receiving a first uplink grant, after a MAC reset process is completed. The UE waits for the first uplink grant to be received from an ENB of the target cell, without immediately restarting the PHR Periodic Timer, after the completion of the MAC reset process, because the UE normally sends an important control message, e.g., a handover complete message, using the resource allocated in the first uplink grant, after the MAC reset. Accordingly, if the UE were to immediately restart the PHR Periodic Timer, after the MAC reset is completed, the UE would occasionally transmit a PHR instead of the important control message or a part of the important control message because the PHR Periodic Timer may expire at the same time the UE should send the important control message to the ENB of the target cell, after receiving the first uplink grant. However, if the UE restarts the PHR Periodic Timer upon receiving the first uplink grant, after occurrence of the MAC reset, as illustrated in FIG. 4, it is possible to prevent the PHR from being transmitted during the first uplink transmission.

Referring to FIG. 4, the UE receives an uplink grant indicating allocation of an uplink resource for new transmission in the target cell from an ENB of the target cell in step 405. In step 410, the UE determines whether the uplink grant is a first uplink grant to be received after a previous MAC reset.

The uplink grant that is the first received uplink grant after the MAC reset, is the same as an uplink grant that a UE first receives after a handover to a target cell. Basically, an uplink grant can be classified as an uplink grant for a new transmission and an uplink grant for a retransmission, and in the present invention, the uplink grant is to be construed as an uplink grant for a new transmission.

When the uplink grant is the first received uplink grant, after a MAC reset, in step 410, the UE restarts a PHR Periodic Timer in step 415. Accordingly, the UE is able to transmit the periodic PHR to the ENB of the target cell even after the MAC reset.

However, if the uplink grant is not the first received uplink grant, after a MAC reset, in step 410, e.g., if the operation in step 415 has already been performed, the UE proceeds with the uplink transmission process in step 420.

Figure 5:
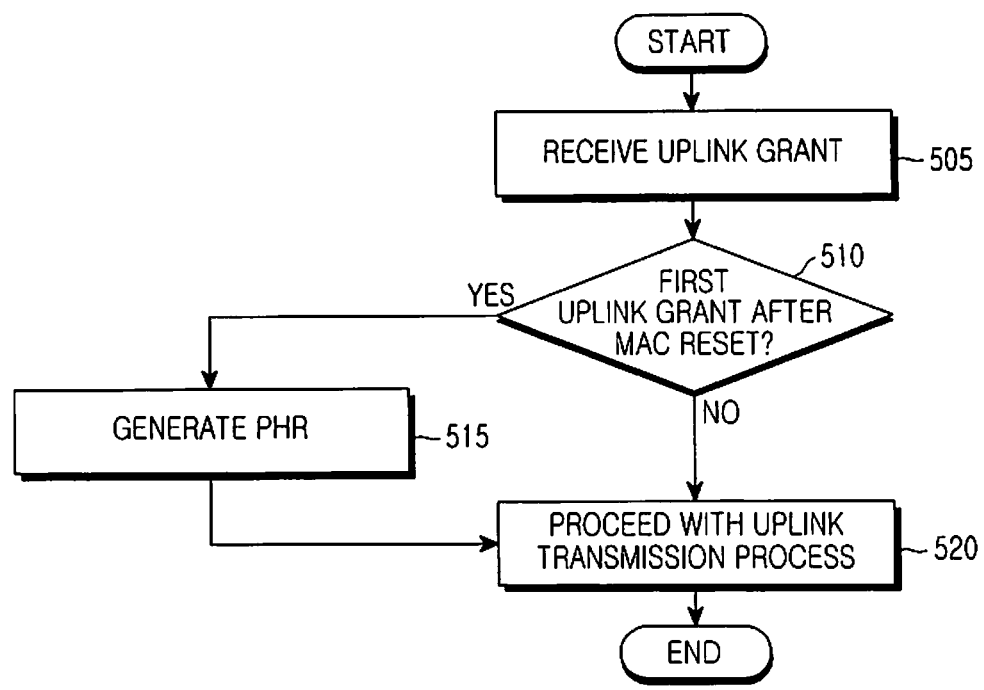
FIG. 5 is a flowchart illustrating an operation of a UE according to an embodiment of the present invention.

FIG. 5 illustrates an operation of a UE according to another embodiment of the present invention, wherein the UE may transmit a periodic PHR in a target cell, even after a handover is performed, i.e., after a MAC reset is completed. Specifically, the UE generates the PHR, after completing the MAC reset process, because the PHR Periodic Timer is automatically restarted when a PHR is generated.

Referring to FIG. 5, the UE receives an uplink grant from a target cell in step 505. In step 510, the UE determines whether the uplink grant is a first uplink grant to be received since performing a previous MAC reset. If the uplink grant is the first uplink grant, the UE generates a PHR in step 515 in order to transmit the periodic PHR after the MAC reset, and then performs an uplink transmission process in step 520. Accordingly, the UE can transmit the periodic PHR in the target cell, even after the handover. However, if the uplink grant is not the first uplink grant received after the previous MAC reset, in step 510, e.g., if the operation of step 515 has already been performed, the UE directly performs the uplink transmission process in step 520.

Figure 6:
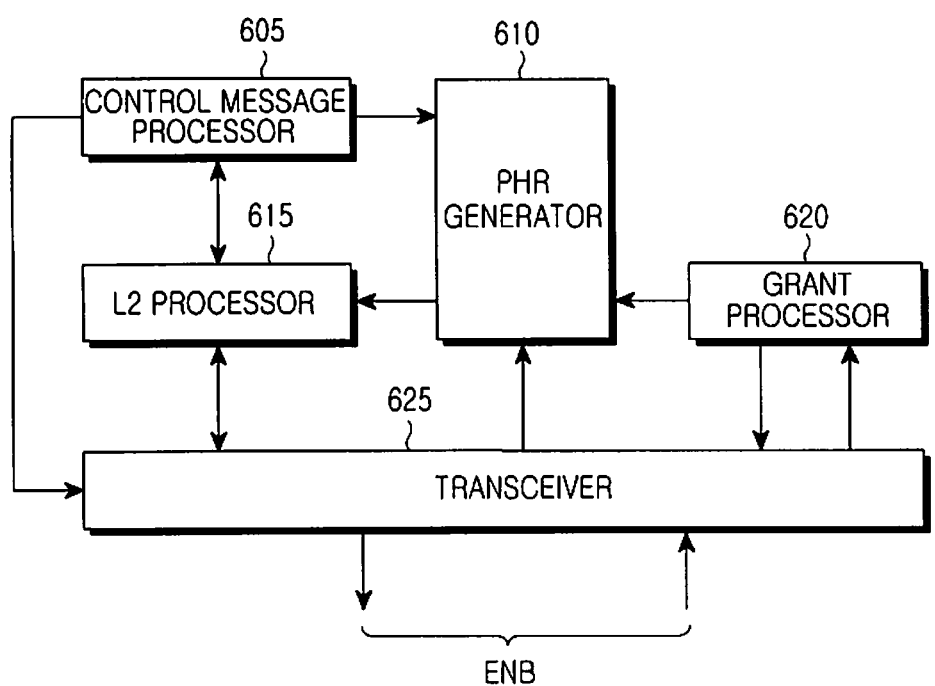
FIG. 6 is a block diagram illustrating a UE apparatus according to an embodiment of the present invention.

FIG. 6 illustrates a UE apparatus according to an embodiment of the present invention.

Referring to FIG. 6, a UE 600 includes a control message processor 605, a Layer 2 (L2) processor 615, a PHR generator 610, a grant processor 620, and a transceiver 625.

The control message processor 605 processes various control messages that are transmitted and received over the wireless network. Among other things, the control message processor 605 resets the L2 processor 615 when a control message received form an ENB includes a handover command.

The L2 processor 615 includes a MAC processor. Upon receipt of a reset command from the control message processor 605, the L2 processor 615 notifies the PHR generator 610 of the reset of a MAC layer due to the MAC reset.

The PHR generator 610 controls a PHR Periodic Timer for generation of a periodic PHR. For example, the PHR generator 610 controls the PHR Periodic Timer to start, restart, and stop.

Upon receiving a MAC reset notice from the control message processor 605, the PHR generator 610 may stop or restart the PHR Periodic Timer. More specifically, according to an embodiment of the present invention, as illustrated in FIG. 2, upon occurrence of a MAC reset, the PHR generator 610 maintains the running of the PHR periodic timer, even though all other timers are stopped in the UE.

According to an embodiment of the present invention, as illustrated in FIG. 3, the PHR generator 610 restarts the PHR Periodic Timer after completion of the MAC reset. According an embodiment of the present invention, as illustrated in FIG. 4, the PHR generator 610 restarts the PHR Periodic Timer upon receiving a first uplink grant after completion of the MAC reset. According an embodiment of the present invention, as illustrated in FIG. 5, the PHR generator 610 generates a periodic PHR upon receiving the first uplink grant, after completion of the MAC reset. The PHR generator 610 then provides the generated periodic PHR to the L2 processor 615.

The PHR Periodic Timer (not shown) may be included in the PHR generator 610, or may be provided as a separate timer.

The L2 processor 615, which is a Radio Link Control (RLC) device or a MAC device, can frame upper layer data including a Layer 3 (L3) control message in an appropriate size, employ Hybrid Automatic Repeat reQuest (HARQ) operation, and provide a multiplexing function. In addition, the L2 processor 615 restores data provided from the transceiver 625 to its original upper layer data, and provides it to an appropriate upper layer. Also, the L2 processor 615 multiplexes a specific control message like the PHR and provides it to the transceiver 625.

The grant processor 620 recognizes allocated transmission resources by analyzing a grant received over a wireless channel. The grant processor 620 notifies the PHR generator 610 of a possibility of uplink transmission, and controls the transceiver 625 so that the transceiver 625 may transmit and receive data over the wireless channel using the allocated transmission resources.

The transceiver 625 transmits MAC PDUs provided from the L2 processor 615 over the wireless channel. Also, the transceiver 625 receives downlink and uplink grants for allocating downlink and uplink transmission resources from the ENB over the wireless channel, and provides the grants to the grant processor 620. The transceiver 625 processes signals received over the wireless channel and provide them to an appropriate upper layer.

While it is shown in FIG. 6 that the control message processor 605, the L2 processor 615, the PHR generator 610 and the grant processor 620 are separate devices, some or all of the components may be implemented as a single controller.

As is apparent from the foregoing description, a UE in accordance with the present invention is capable of preventing a transmission interruption of periodic available transmit power information upon an occurrence of a MAC reset. Similarly, the UE may also prevent an interruption of a periodic available transmit power report after a handover to a new cell.

While the present invention has been shown and described with reference to certain embodiments thereof, it will be understood by those skilled in the art that various changes in form and details may be made therein without departing from the spirit and scope of the present invention as defined by the appended claims and their equivalents.

What is claimed is:

1. A method of a user equipment (UE) in a wireless communication system, the method comprising:

in case that a first message to perform a handover from a first base station to a second base station is received, from the first base station, performing a medium access control (MAC) reset, wherein performing the MAC reset includes stopping a power headroom report (PHR) periodic timer;

receiving, from the second base station, first information related to a first uplink resource;

in case that the first uplink resource is first allocated for a new transmission since the MAC reset is performed, starting the stopped PHR periodic timer;

transmitting, to the second base station, a second message to confirm the handover using the first uplink resource;

triggering a PHR, in case that the started PHR periodic timer expires;

receiving, from the second base station, second information related to a second uplink resource; and transmitting, to the second base station, the triggered PHR using the second uplink resource.

2. The method of claim 1, further comprising:

starting the expired PHR periodic timer.

3. The method of claim 1, wherein starting the stopped PHR periodic timer further comprises:

in case that the first uplink resource is first allocated for the new transmission since the MAC reset is performed, starting the stopped PHR periodic timer without a PHR transmission.

4. The method of claim 1, further comprising:

identifying that the MAC reset occurs; and identifying whether the first uplink resource is first allocated for the new transmission since the MAC reset is performed.

5. The method of claim 1, wherein performing the MAC reset includes stopping a running timer.

6. The method of claim 1, wherein the second uplink resource is not first allocated for the new transmission since the MAC reset is performed.

7. The method of claim 1, wherein the triggered PHR is transmitted to the second base station through a MAC layer message.

8. A user equipment (UE) in a wireless communication system, the UE comprising:

a transceiver; and a controller configured to:

in case that a first message to perform a handover from a first base station to a second base station is received, from the first base station, perform a medium access control (MAC) reset, wherein performing the MAC reset includes stopping a power headroom report (PHR) periodic timer, receive, from the second base station via the transceiver, first information related to a first uplink resource, in case that the first uplink resource is first allocated for a new transmission since the MAC reset is performed, start the stopped PHR periodic timer, transmit, to the second base station via the transceiver, a second message to confirm the handover using the first uplink resource, trigger a PHR, in case that the started PHR periodic timer expires, receive, from the second base station via the transceiver, second information related to a second uplink resource, and transmit, to the second base station via the transceiver, the triggered PHR, using the second uplink resource.

9. The UE of claim 8, wherein the controller is further configured to:

start the expired PHR periodic timer.

10. The UE of claim 8, wherein the controller is further configured to:

in case that the first uplink resource is first allocated for the new transmission since the MAC reset is performed, start the stopped PHR periodic timer without a PHR transmission.

11. The UE of claim 8, wherein the controller is further configured to:

identify that the MAC reset occurs, and identify whether the first uplink resource is first allocated for the new transmission since the MAC reset is performed.

12. The UE of claim 8, wherein the controller is configured to perform the MAC reset by stopping a running timer.

13. The UE of claim 8, wherein the second uplink resource is not first allocated for the new transmission since the MAC reset is performed.

14. The UE of claim 8, wherein the triggered PHR is transmitted to the second base station through a MAC layer message.

* * * * *